(12) United States Patent
Breed (10) Patent No.: US 9,616,747 B1
(45) Date of Patent: Apr. 11, 2017

(54) METHOD FOR CONTROLLING TRAVEL OF GOLF CARTS AND ALL-TERRAIN VEHICLES

(71) Applicant: Intelligent Technologies International, Inc., Miami Beach, FL (US)

(72) Inventor: David S Breed, Miami Beach, FL (US)

(73) Assignee: Intelligent Technologies International, Inc., Miami Beach, FL (US)

( * ) Notice: Subject to any disclaimer, the term of this patent is extended or adjusted under 35 U.S.C. 154(b) by 50 days.

(21) Appl. No.: 14/641,613

(22) Filed: Mar. 9, 2015

Related U.S. Application Data (63) Continuation-in-part of application No. 14/156,661, filed on Jan. 16, 2014, now abandoned.

(60) Provisional application No. 61/757,767, filed on Jan. 29, 2013.

(51) Int. Cl.

| G06F 7/00 | (2006.01) |
|---|---|
| G06F 17/00 | (2006.01) |
| B60K 31/00 | (2006.01) |
| B60R 22/48 | (2006.01) |
| B60R 21/017 | (2006.01) |
| B60R 21/18 | (2006.01) |
| B60R 21/00 | (2006.01) |

(52) U.S. Cl.
CPC ........ *B60K 31/0058* (2013.01); *B60R 21/017* (2013.01); *B60R 21/18* (2013.01); *B60R 22/48* (2013.01); *B60K 2031/0091* (2013.01); *B60R 2021/0048* (2013.01); *B60R 2022/4816* (2013.01); *B60R 2022/4858* (2013.01); *B60R 2022/4883* (2013.01)

(58) Field of Classification Search
None
See application file for complete search history.

(56) References Cited

U.S. PATENT DOCUMENTS

| 3,226,674 | A |  | 12/1965 | Eriksson | |
|---|---|---|---|---|---|
| 3,801,156 | A |  | 4/1974 | Grang | |
| 3,865,398 | A |  | 2/1975 | Woll | |
| 3,866,940 | A |  | 2/1975 | Lewis | |
| 3,933,370 | A | * | 1/1976 | Abe | B60R 21/18 |
|  |  |  |  |  | 280/733 |
| 3,970,329 | A |  | 7/1976 | Lewis | |
| 3,975,037 | A | * | 8/1976 | Hontschik | B60N 2/2839 |
|  |  |  |  |  | 280/733 |
| 4,319,658 | A | * | 3/1982 | Collonia | B60K 26/04 |
|  |  |  |  |  | 123/339.18 |

(Continued)

*Primary Examiner* — Bhavesh V Amin
(74) *Attorney, Agent, or Firm* — Brian Roffe (57) ABSTRACT

Method for regulating travel of a golf cart or all-terrain vehicle includes determining, using an electronic controller on the golf cart or all-terrain vehicle, seatbelt usage for each occupant of the golf cart or all-terrain vehicle, and determining, using the electronic controller, whether the golf cart or all-terrain vehicle is travelling on or about to travel on a road which permits higher speed operation of golf carts and all-terrain vehicles. When it is determined that the golf cart or all-terrain vehicle is travelling on a road which permits higher speed operation of golf carts and all-terrain vehicles, travel of the golf cart or all-terrain vehicle is enabled on the road which permits higher speed operation only when all occupants are determined to be properly wearing seatbelts or the seatbelts are determined to be in buckled and/or spooled-out a set distance or within a distance range.

20 Claims, 6 Drawing Sheets

(56) References Cited

U.S. PATENT DOCUMENTS

| | | | | |
|---|---|---|---|---|
| 4,348,037 | A * | 9/1982 | Law | B60R 21/18 244/122 B |
| 5,062,662 | A * | 11/1991 | Cameron | B60R 21/18 280/733 |
| 5,288,104 | A * | 2/1994 | Chen | B60R 21/18 280/733 |
| 5,335,936 | A * | 8/1994 | Faigle | B60R 21/215 280/728.2 |
| 5,375,908 | A * | 12/1994 | Goor | B60R 21/01 297/216.11 |
| 5,390,952 | A * | 2/1995 | Goor | B60R 21/01 280/730.1 |
| 5,404,128 | A * | 4/1995 | Ogino | B60R 22/48 180/273 |
| 5,456,491 | A * | 10/1995 | Chen | B60R 21/18 280/729 |
| 5,460,402 | A * | 10/1995 | Rhodes, Jr. | B60R 21/215 280/728.3 |
| 5,472,231 | A * | 12/1995 | France | B60R 21/18 280/733 |
| 5,597,178 | A * | 1/1997 | Hardin, Jr. | B60R 21/18 280/733 |
| 5,770,997 | A * | 6/1998 | Kleinberg | B60N 2/002 280/235 |
| 5,901,978 | A * | 5/1999 | Breed | B60N 2/002 180/272 |
| 5,915,286 | A * | 6/1999 | Figi | B60R 22/48 73/865.9 |
| 5,966,784 | A * | 10/1999 | Arbogast | B60R 22/48 24/633 |
| 5,983,161 | A * | 11/1999 | Lemelson | G01S 19/11 340/436 |
| 6,084,314 | A | 7/2000 | McCurdy | B60N 2/002 307/10.1 |
| 6,250,672 | B1 * | 6/2001 | Ryan | B60R 21/01546 180/268 |
| 6,254,127 | B1 * | 7/2001 | Breed | B60N 2/002 280/731 |
| 6,260,650 | B1 * | 7/2001 | Gustavsson | B60K 28/04 180/268 |
| 6,422,595 | B1 * | 7/2002 | Breed | B60N 2/002 180/272 |
| 6,460,881 | B1 | 10/2002 | Adomeit | |
| 6,485,057 | B1 * | 11/2002 | Midorikawa | B60R 21/01 280/801.1 |
| 6,519,519 | B1 * | 2/2003 | Stopczynski | B60R 21/013 280/734 |
| 6,951,350 | B2 | 10/2005 | Heidorn et al. | |
| 7,264,267 | B2 | 9/2007 | Kine et al. | |
| 7,413,220 | B2 | 8/2008 | Itoga et al. | |
| 7,434,833 | B2 | 10/2008 | Kore | |
| 7,513,524 | B2 * | 4/2009 | Oota | B60R 21/18 280/733 |
| 7,561,951 | B2 * | 7/2009 | Rao | B60W 50/035 180/268 |
| 7,571,931 | B2 * | 8/2009 | Watanabe | B60R 21/18 280/733 |
| 7,665,761 | B1 | 2/2010 | Green et al. | |
| 7,677,598 | B1 | 3/2010 | Ryan et al. | |
| 7,686,119 | B2 * | 3/2010 | Greene | B60R 22/48 180/268 |
| 7,766,382 | B2 | 8/2010 | Murakami | |
| 7,789,420 | B2 | 9/2010 | Kokeguchi et al. | |
| 7,798,522 | B2 | 9/2010 | Itoga | |
| 7,874,582 | B2 | 1/2011 | Murakami | |
| 7,971,902 | B2 | 7/2011 | Azuma et al. | |
| 7,974,748 | B2 * | 7/2011 | Goerick | B60K 28/165 701/28 |
| 7,980,590 | B2 | 7/2011 | Foubert et al. | |
| 8,308,190 | B2 | 11/2012 | Smith et al. | |
| 8,464,824 | B1 * | 6/2013 | Reisenberger | B60K 28/10 180/268 |
| 8,517,418 | B2 | 8/2013 | Schondorf et al. | |
| 8,556,293 | B2 | 10/2013 | Baca et al. | |
| 8,585,084 | B1 | 11/2013 | Schneider | |
| 8,651,519 | B2 | 2/2014 | Czach et al. | |
| 8,672,347 | B2 | 3/2014 | Schneider et al. | |
| 8,740,244 | B2 | 6/2014 | Obadia | |
| 8,775,030 | B2 * | 7/2014 | Mages | B60R 21/0132 180/268 |
| 8,781,705 | B1 * | 7/2014 | Reisenberger | B60K 28/04 180/268 |
| 8,840,137 | B2 | 9/2014 | Schneider et al. | |
| 8,914,196 | B1 * | 12/2014 | Breed | B60R 21/0132 180/271 |
| 2002/0041088 | A1 | 4/2002 | Grace et al. | |
| 2002/0089157 | A1 * | 7/2002 | Breed | B60J 10/00 280/735 |
| 2004/0178902 | A1 * | 9/2004 | Koike | B60R 22/48 340/457.1 |
| 2005/0150704 | A1 * | 7/2005 | Tanaka | B60R 21/013 180/268 |
| 2005/0189752 | A1 | 9/2005 | Itoga et al. | |
| 2006/0028004 | A1 | 2/2006 | Oota et al. | |
| 2006/0192370 | A1 * | 8/2006 | Abe | B60R 21/0132 280/735 |
| 2006/0208471 | A1 | 9/2006 | Sundararajan et al. | |
| 2006/0255573 | A1 | 11/2006 | Tobata et al. | |
| 2007/0021892 | A1 * | 1/2007 | Takemura | B60R 22/44 701/45 |
| 2007/0085697 | A1 * | 4/2007 | Breed | H04Q 9/00 340/4.62 |
| 2007/0239331 | A1 * | 10/2007 | Kaplan | B60R 25/04 701/36 |
| 2007/0285219 | A1 * | 12/2007 | Greene | B60R 22/48 340/457.1 |
| 2009/0051150 | A1 | 2/2009 | Murakami | |
| 2012/0101688 | A1 * | 4/2012 | Sugiyama | B60R 21/18 701/45 |
| 2013/0009391 | A1 * | 1/2013 | Miller | B60R 22/46 280/806 |
| 2013/0190990 | A1 | 7/2013 | Haidar | |

* cited by examiner

METHOD FOR CONTROLLING TRAVEL OF GOLF CARTS AND ALL-TERRAIN VEHICLES

CROSS REFERENCE TO RELATED APPLICATIONS

This application is a continuation-in-part of U.S. patent application Ser. No. 14/156,661 filed Jan. 16, 2014, which claims priority under 35 U.S.C. §119(e) of U.S. provisional patent application Ser. No. 61/757,767 filed Jan. 29, 2013, now expired, which are incorporated by reference herein.

This application is related to U.S. patent application Ser. No. 14/069,760 filed Nov. 1, 2013, the disclosure of which is incorporated by reference herein.

FIELD OF THE INVENTION

The present invention relates to a method for regulating travel of a golf cart or all-terrain vehicle in which in order for a golf cart or all-terrain to be driven above a certain speed, an airbag-containing seatbelt must be in use and presumably buckled.

The present invention also relates generally to a safety restraint system for a "street legal" golf cart or all-terrain vehicle, or other similar vehicles (excluding automobiles that have doors and frames to which airbags may be mounted). Specifically, the present invention relates to a safety restraint system having at least one seat-mounted airbag and/or at least one seatbelt-mounted airbag, an interlock system to prevent excessive speed and/or operation on roadways without seatbelt use and an electronic crash sensor system for controlling deployment of the safety restraint system, and more specifically controlling deployment of the airbags. Airbag deployment control includes deciding whether to inflate or otherwise actuate each airbag so that for each crash, a specific subset or all of the airbags may be deployed as a function of the crash properties.

BACKGROUND OF THE INVENTION

General

Golf carts are primarily used for the transportation of golfers for use on golf courses, between golf courses and clubhouses, etc. However, their use has been expanded to serve as general purpose vehicles in retirement communities usually, but not always, associated with a golf course. Their use has continued to expand to where they are now street legal on roads having maximum speed limits of 35 mph, for example, and the vehicles themselves have a maximum speed of typically about 25 mph. As such, golf carts can now be seen in major cities such as New York City. Similar vehicles, referred to commonly as all-terrain vehicles (ATVs), are frequently used on back roads and trails. According to an entry from Wikipedia, an all-terrain vehicle (ATV), also known as a quad, quad bike, three-wheeler, or four-wheeler, is defined by the American National Standards Institute (ANSI) as a vehicle that travels on low-pressure tires, with a seat that is straddled by the operator, along with handlebars for steering control. It is designed to handle a wider variety of terrain than most other vehicles. An all-terrain vehicle is not, for the purposes herein, defined as a vehicle capable of travelling on all terrains, but rather by the Wikipedia definition or another similar definition.

Little attention has been paid to the safety of operators and passengers of such vehicles and many people have been injured and fatalities have occurred arising from the use of such vehicles.

Due to their low speed, such vehicles are exempt from federal motor vehicle safety standards that are applied to automobiles. However, due to the proliferation of such vehicles, there is now interest in providing safety restraint systems to protect passengers of these vehicles from injury and death as a result of accidents involving the vehicles. This problem is receiving increased attention due to the desire of the manufacturers of such vehicles to expand their use to higher speeds and on higher speed limit roads.

Occupant Protection Problem

Golf carts and similar all-terrain vehicles have little structure to absorb crash energy from frontal or side impacts. There is also little structure to support airbags which might be deployed from steering wheels or instrument panels of the golf carts, as in standard automobiles. The angle of the steering column, for example, is generally poor such that even if an airbag were situated in and deployed from a steering wheel during a crash, the impact of a driver with such an airbag would cause excessive rotation of the steering column, thereby substantially reducing the effectiveness of the deploying airbag. Additionally, the crash pulse from a frontal impact will be of extremely short duration making it very difficult to deploy airbags in time to protect the occupant during a frontal impact.

Seatbelts offer the best opportunity for protecting occupants of these vehicles. However, when used to transport golfers around golf courses, the requirement of buckling and unbuckling a seatbelt every time an occupant enters into and disembarks from the vehicle would be unacceptable. Thus, a system is needed which mandates the use of seatbelts while the vehicle is traveling at higher speeds and/or on higher speed limit roadways.

In this regard, U.S. Pat. No. 3,226,674, incorporated by reference herein, discloses a safety interlock system for automobiles which permits the operation of the vehicle at low speeds but requires the use of seatbelts at higher speeds.

Although seatbelts will provide a significant safety feature for golf carts, ATVs and similar vehicles, they are insufficient to protect occupants in all but minor accidents. The lack of structure in these vehicles exposes occupants to severe intrusion risks, plus standard seatbelts allow significant motion of the occupant particularly in side impacts. Thus, other protection mechanisms are necessary such as seatbelt-resident airbags and airbags which deploy from the seat structure. For seatbelt-resident airbags, a seatbelt switch interlock system is desirable. This prevents the airbags from deploying, except when they are engaged even if the seat is occupied.

A crash sensor system for assessing the need for airbag deployment could utilize a distributed sensor system in the crush zone of the vehicle as is common in automobile airbag systems. However, since the occupants are required to use seatbelts in this system, and, due to the short space between the front of the vehicle and the passenger compartment, distributed crash sensors will not provide a significant time advantage nor is this advantage needed since the occupants are wearing seatbelts. A single point passenger compartment sensor will satisfy the requirements of this system. One candidate for such a single point crash sensor is disclosed in U.S. patent application Ser. No. 14/069,760, cross-referenced above.

Although golf carts, ATVs and similar vehicles contain speedometers, such devices are easily disconnected either by accident or by intention. The GPS corrected IMU crash sensor of the '760 patent application contains an inertial measurement unit which is capable of accurately determining the velocity of the vehicle independently of the vehicles speedometers. This device can thus be used to control a governor or other system that limits the vehicle speed, in particular, if the seatbelts are not engaged.

In addition to a speed requirement, it can be additionally required that when the vehicle operates on a known roadway, the seatbelts also are required to be worn. The GPS system contained in the GPS corrected IMU crash sensor of the '760 patent application can also be used in conjunction with a map database to indicate the class of road on which the vehicle is traveling. In this case, the vehicle speed can be curtailed if the seatbelts are not engaged.

SUMMARY OF THE INVENTION

At present, there are no known occupant restraints used on golf carts or ATVs. These vehicles are not typical automobiles or cars with a frame having a ceiling and a closed interior, occupant-receiving compartment, two or more doors that are pivotally attached to the frame to provide access to the compartment, etc. Rather, such vehicles are characterized generally by a frame that defines openings all round, e.g., there are no doors that close an interior compartment. Thus, the sides of the golf cart or all-terrain vehicle are generally open, along with the front and rear of the seating locations.

Such vehicles are now being designed for use on higher speed roadways. Even today, many people are being injured and a few even killed during use of these vehicles. Injuries and fatalities will naturally increase as these vehicles are operated at higher speeds and on higher speed limit roadways. There is a need, therefore, for a restraint system to protect the occupants of such vehicles.

The present invention provides such a restraint system. Components of this system can include seatbelts containing at least one deployable airbag, seats containing at least one deployable airbag, a GPS corrected IMU crash sensor which can also be used for determining the vehicle velocity and whether the vehicle is being operated on higher speed roadways, and an interlock system which prevents the vehicle from traveling at speeds above a specified value or on specified roadways if one or more of the occupants of the vehicle are not wearing seatbelts.

In one implementation of this invention, deployable airbags are packaged, contained or housed within the shoulder and/or lap seatbelts, i.e., contained within the web or belt of the shoulder belt and/or the lap belt. In another implementation, additional airbags are also or alternately placed in the seat to protect occupants from injury from intruding vehicles or other structures and/or from rollovers. In this case, the lap belt may be designed so that the upper anchorage point is near the center of the vehicle rather than its traditional outboard location. Also in this case, the occupant is protected from impacts or intrusions from both sides and from impacting adjacent occupants. The system can be designed as a mirror image of this design with the upper shoulder seatbelt anchorage point on the outside of the seat and the additional airbags emanating from the inside edge of the seat.

In another implementation of this invention, an extended airbag can be deployed upward from the lap belt which will serve to offer additional protection to the head and torso of the occupant in a frontal impact.

A single inflator can be used to inflate all of the seat-mounted and seatbelt-mounted airbags or individual airbags can have separate inflators.

Each seat can have its own crash sensor or a single centrally located crash sensor can be used for all inflatable restraints. The crash sensor can be a GPS corrected IME as depicted in the '760 patent application. This crash sensor can be used for sensing impacts from any direction as well as rollovers. The crash sensor can also be used to determine the velocity of the vehicle and its location on a map and in particular the class of road on which it is approaching or traveling.

A method for regulating travel of a golf cart or all-terrain vehicle in accordance with the invention includes determining, using an electronic controller on the golf cart or all-terrain vehicle, usage of a seatbelt (preferably one containing an airbag as described above) for each of the occupants of the golf cart or all-terrain vehicle, and determining, using the electronic controller on the vehicle, whether the golf cart or all-terrain vehicle is travelling on or about to travel on a road which permits higher speed operation of golf carts and all-terrain vehicles. When it is determined that the golf cart or all-terrain vehicle is travelling on a road which permits higher speed operation of golf carts and all-terrain vehicles, travel of the golf cart or all-terrain vehicle is enabled on the road which permits higher speed operation only when all seatbelts are determined to be in use.

Airbag deployment is thus enabled when it is determined that the golf cart or all-terrain vehicle is travelling on or about to travel on a road which permits higher speed operation of golf carts and all-terrain vehicles. More specifically, deployment of a face protection airbag contained within a lap belt that is adapted to extend across a lap of the occupant when present in one of the seats is enabled and/or deployment of a face protection airbag contained within a shoulder belt that is adapted to extend diagonally across a torso of the occupant when present in one of the seats is enabled. The face protection airbag are deployable outward from the lap belt and/or shoulder belt and upward to attain a position alongside the head of the occupant when present in the seat and thereby provide a cushion for the head of the occupant when present in the seat.

Occupancy of each seat may be determined by interrogating switches or sensors associated with the seats whereby each switch or sensor provides a signal indicative of occupancy of the seat and/or considering data from a weight sensing switch arranged in each seat and that providing an indication of weight applied to the seat. Seatbelt usage may be determined by interrogating switches associated with the seatbelts whereby each switch provides a signal indicative of budding of the associated seatbelt and/or considering data from a spool-out sensor coupled to the seatbelt and that provides an indication of spool out of the seatbelt.

Determining whether the golf cart or all-terrain vehicle is travelling on or about to travel on a road which permits higher speed operation of golf carts and all-terrain vehicles may entail using GPS to obtain the current location of the vehicle and a map database containing location data on roads which permit higher speed operation of golf carts and all-terrain vehicles. Additionally or alternatively, determining whether the golf cart or all-terrain vehicle is travelling on or about to travel on a road which permits higher speed operation of golf carts and all-terrain vehicles may entail comparing the current location of the golf cart or all-terrain vehicle to information about the road at that location. Additionally or alternatively, determining whether the golf cart or all-terrain vehicle s travelling on or about to travel on a road which permits higher speed operation of golf carts and all-terrain vehicles may entail comparing the current location and velocity of the golf cart or all-terrain vehicle to information about the road ahead of the current location to which the golf cart or all-terrain vehicle is directed based on the current location and velocity.

While the golf cart or all-terrain vehicle is travelling on a road which permits higher speed operation of golf carts and all-terrain vehicles, it is possible to repeating the step of determining whether the golf cart or all-terrain vehicle is travelling on or about to travel on a road which permits higher speed operation of golf carts and all-terrain vehicles, and when it is determined that the golf cart or all-terrain vehicle is travelling on a road which does not permit higher speed operation of golf carts and all-terrain vehicles, cause the golf cart or all-terrain vehicle to reduce its speed. Similarly, it is possible to, while the golf cart or all-terrain vehicle is travelling on a road which permits higher speed operation of golf carts and all-terrain vehicles, repeat the seatbelt usage determining step, and when it is determined that a seatbelt for an occupant is no longer being used or buckled, cause the golf cart or all-terrain vehicle to reduce its speed.

Another method for regulating travel of a golf cart or all-terrain vehicle, includes determining, using an electronic controller on the vehicle, usage of seatbelts on the golf cart or all-terrain vehicle for each occupant of the golf cart or all-terrain vehicle, and limiting a speed of the golf cart or all-terrain vehicle when at least one seatbelt associated with an occupant is determined not to be in use, e.g., not to be buckled. The seatbelts preferably have at least one associated airbag. The same variations described for the method above may be applied in this method as well.

BRIEF DESCRIPTION OF THE DRAWINGS

The following drawings are illustrative of embodiments of the system developed or adapted using the teachings of at least one of the inventions disclosed herein and are not meant to limit the scope of the invention as encompassed by the claims

DETAILED DESCRIPTION OF THE INVENTION

An object of this invention is to provide an occupant restraint system and arrangement for vehicles which have limited protective front and side structures, such as golf carts and some all-terrain vehicles (ATV), among others (as well as a method for protecting occupants in such vehicles). To accomplish this objective, and possibly others, the occupant must be surrounded as much as practical with energy absorbing structures such as airbags. Since in most cases, the airbags cannot be deployed from the limited vehicle structure present on these types of vehicles, such as the instrument panel, steering wheel, and roof rail, the airbags can preferably be deployed from structures which are related to the vehicle seat. Structures related to the vehicle seat include, but are not limited to, the seat itself and the seatbelt. Of course, for seatbelt-resident airbags to perform their function, the seatbelt must be worn. Furthermore, preferred areas of the vehicle such as the frontal crush zone cannot be relied upon for satellite-mounted crash sensors and thus this system should be initiated by a crash sensor which is centrally mounted with respect to the seats. Since such single point sensors can trigger late on marginal crashes, it is important that the seatbelts are in use.

Figure 1A:
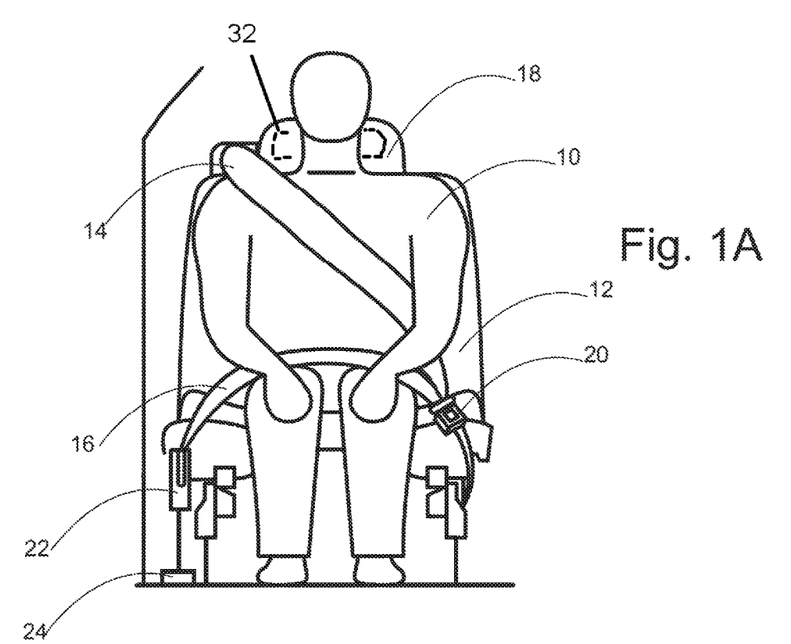
FIG. 1A is a front view of an occupant being restrained by airbag-containing lap and shoulder belts in their pre-inflated condition.
Figure 1B:
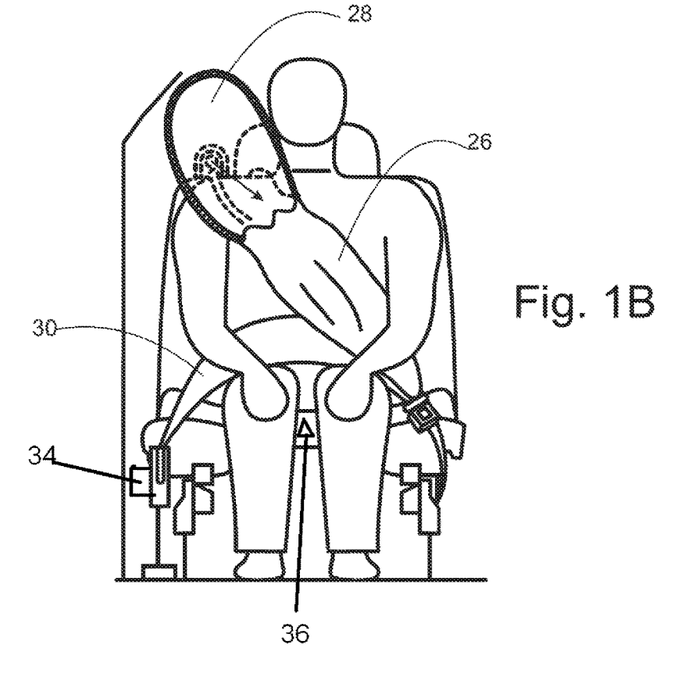
FIG. 1B is a view as in FIG. 1A with the lap and shoulder belts inflated where the shoulder belt contains a projecting airbag to protect the head of the occupant.

One preferred embodiment of this invention is illustrated in FIGS. 1A and 1B. An occupant 10 is shown sitting on a vehicle seat 12 and restrained by a seatbelt having a shoulder portion 14 and a connected lap portion 16, collectively referred to as a seatbelt. Although shown as a single seatbelt having a shoulder portion 14 and a lap portion 16, two seatbelts may alternatively be provided, in this embodiment and in all of the other embodiments disclosed herein. In such a case, there would be a lap seatbelt extending across the lap of the occupant 10 and a shoulder seatbelt designed to extend diagonally across the torso of the occupant 10. Also, although only one seat 12 is shown, the other seat or seats in the vehicle would be simply configured with airbag-containing seatbelt portions 14, 16.

These seatbelt portions 14, 16 each contain at least one inflatable airbag, for example, as described in detail in U.S. Pat. Appln. Publ. No, 2006/0208471, entitled inflatable seatbelt system, which is incorporated by reference herein. The airbag in the shoulder portion 14 may fluidly communicate with the airbag in the lap portion 16 to enable gas to flow from one airbag to the other if the inflator directly inflates only one airbag, as well as between the airbags. Different fluid communication schemes between one or more of the airbags in the shoulder portion 14 and one or more airbags in the lap portion 16 are also envisioned, e.g., to provide two or more different, separate airbag inflation possibilities.

Although not shown, headrest 18 can also contain at least one inflatable airbag which can further protect the back and sides of the head of the occupant 10. These airbags would be inflated and have their inflation controlled in the same manner as the airbags in the shoulder portion 14 and the lap portion 16 are controllably inflated.

The airbags in the seatbelt portions 14 and 16 are inflated by an inflator or inflation system 22, which may be or include a pyrotechnic or stored gas inflator. The inflation system 22 includes a fluid outlet that communicates with any airbags in the shoulder and lap seatbelt portions 14, 16. The inflation system 22, when initiated, thus generates, or provides from storage, inflating fluid that is directed through a conduit system to the airbags to inflate the airbags.

A seatbelt buckle 20 can contain a switch (not shown) which indicates to the system that the seatbelt comprised of shoulder and lap portions 14, 16 is buckled and in use.

Spool-out sensors, not shown, may also be used to ascertain that the seatbelt comprised of shoulder and lap portions 14, 16 is not buckled behind the occupant 10.

The seat 12 also preferably contains within its lower cushion, a weight sensing switch or sensor, not shown, which indicates or confirms that the seat 12 is occupied. Both spool-out and weight sensors are well known in the art. Any type and position of spool-out sensors and weight sensors may be used in the invention, to the extent there is interference with the functionality or operability of the remaining system components.

An electronic control unit, ECU 24, is shown mounted on the floor of the vehicle but can also be mounted on the seat structure, provided that structure is sufficiently rigidly attached to the vehicle floor or structure. The ECU 24 can contain a GPS-corrected IMU crash sensor as described in the '760 patent application, or be otherwise coupled to one or more similar or different crash sensors. The crash sensor contained in the ECU 24 may be considered an example of crash sensor means, of which other types known to those skilled in the art are possible for use in the invention.

The ECU 24 can also contain a capacitor and/or rechargeable battery backup power supply with sufficient stored energy to initiate deployment of the inflation system 22 to which it is coupled. Switch signals from the seatbelt buckle switch, signals from the spool-out sensors and signals from the weight sensing switches or sensors are coupled to and provide inputs to the ECU 24. This coupling to enable signal transfer may be via the vehicle bus, separate wires or wirelessly. Additionally, although not illustrated, ECU 24 is preferably connected to the vehicle power and also to the airbag systems used with other seats in the vehicle, if any. Thus, the ECU 24 serves as a control system that receives input from each crash sensor contained therein or coupled thereto, and other occupant characteristic determining sensors and switches (collectively referred to as "occupant characteristic determining means"), and based thereon, controls deployment of the airbags in the seatbelt comprised of shoulder and lap portions 14, 16. The ECU 24 therefore may be considered safety system deployment control means, of which other types known to those skilled in the art are possible for use in the invention. Other types of occupant characteristic determining means known to those skilled in the art are possible for use in the invention.

Since the occupant 10 can be assumed to be wearing the seatbelt comprised of shoulder and lap portions 14, 16, the timing for the crash sensor to initiate deployment of the airbags is substantially relaxed. This relaxation may be implemented through design of the control system. This is particularly important in slow marginal crashes where an unrestrained occupant can be displaced significantly from the vehicle seat 12 due to the slow onset of the crash and be located out of position for a conventional airbag system.

The GPS corrected crash sensor can also perform other functions, whether alone or in combination with the ECU 24 processing, information provided by the crash sensor, such as determining the velocity of the vehicle and its location relative to various road classes. If the vehicle is traveling on a golf course, for example, at a velocity below about 15 mph, for example, then the vehicle, operator can proceed without the occupants' wearing seatbelts. The ECU 24 would analyze the velocity data provided by the crash sensor and not take action to stop travel of the vehicle thereby permitting continued travel of the vehicle.

If the vehicle approaches a highway or other higher speed roadway, for example, then the operator can be warned that to proceed onto that roadway, each vehicle occupant must engage their seatbelts. This warning may be provided by a warning system controlled by the ECU 24 that has analyzed data from the crash sensor and seatbelt buckle switch, and determined that the vehicle is approaching a highway or other higher speed roadway and one or more of the occupants is/are not currently wearing their seatbelts.

If all of the vehicle occupants do not put on their seatbelts, which may be determined by the ECU 24 analyzing, data from the seatbelt buckle switch, then the vehicle can be prevented from entering the roadway. Similarly, if the vehicle is traveling on a city street, for example, then the velocity of the vehicle can be limited to 15 mph, for example, if the occupants are not wearing their seatbelts. The ECU 24 may be designed to stop operation of the engine, i.e., control an engine cut-off system, or control a vehicle guidance system to prevent travel of the vehicle on the roadway or limiting of the vehicle's velocity.

The information as to the vehicle velocity and the class of road upon which it is traveling can be functions performed by the ECU 24, provided for example, a GPS chip and appropriate accelerometers such as contained within an IMU (inertial measurement unit) are present in the ECU 24.

The ECU 24 should also include an updated database showing the locations of roads and their classes (which may be implemented as a definition of the speed and type of vehicle permitted on the road). To maintain this database current, the ECU 24 may also require a telematics connection. To wit, the ECU 24 would include or be coupled to a communications portion or unit that communicates with a database update service to enable transmission of database updates to the onboard ECU 24. The manner in which a map database can be updated is known to those skilled in the art and is not limited in the invention to any one particular map updating technique.

In FIG. 1B, the lap seatbelt portion 16 is shown inflated as 30 and the shoulder seatbelt portion 14 is shown inflated as 26 and 28. Reference 28 is an extension of the shoulder seatbelt portion airbag to provide protection for the head of the occupant 10, primarily for side impacts and rollover accidents. Side impacts and rollover accidents can be discriminated by the ECU considering the input information, as well as frontal and rear impacts. Pattern recognition may be used to discriminate different types of crashes based on the input data from the sensors on the vehicle.

In FIGS. 1A and 1B, the inflator 22 was illustrated as mounted to the vehicle seat 12, i.e., the bottom cushion portion of the seat 12.

Figure 2:
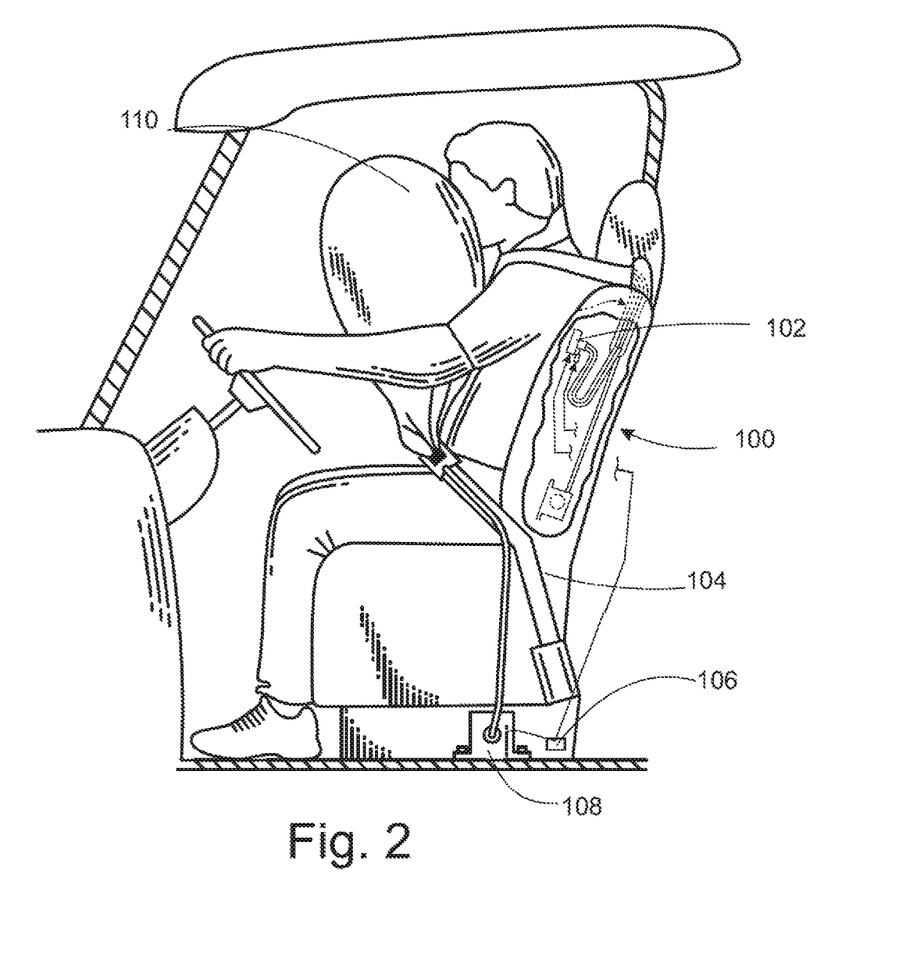
FIG. 2 illustrates an upward deploying lap belt mounted airbag where the inflator is located within the seat.

By contrast, in the embodiment shown in FIG. 2, the inflator for the lap and shoulder belts illustrated generally at 100 is mounted in the seat back itself. Inflator 100 includes a gas generating system 102 that generates gas to inflate the airbags in the seatbelts through tubes as described in U.S. Pat. Appln. Publ. No. 2012/0101688, incorporated by reference herein. An alternative inflator is shown at 104 located within the seatback. An alternate inflator is shown at 108 which is used to inflate the face protection airbag 110. Both systems can be controlled by ECU 106. Alternatively, a gas providing system that has stored, compressed gas may be used instead of a gas generating system.

Figure 3:
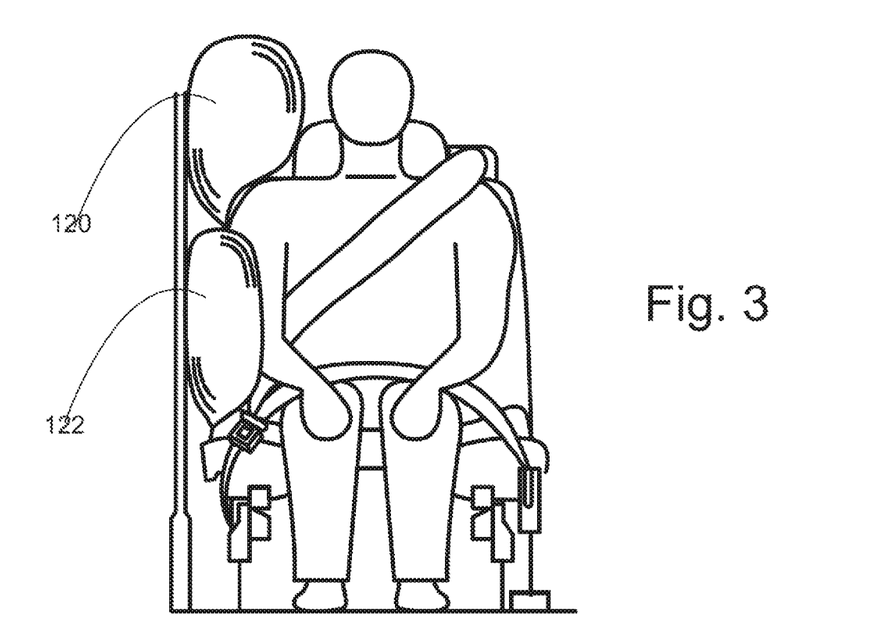
FIG. 3 illustrates a case wherein airbags emanate from the seat to protect the head and thorax of the occupant and where the seatbelt anchorage is on the opposite side of the seat from the vehicle door.

FIG. 3 illustrates an embodiment of the invention utilizing airbags that can be deployed from the seat primarily to protect the occupant from side and rollover accidents. These airbags 120, 122 are housed inside the outer layer defining the seat, or on the seat with a deployment door that is removed or opened when deploying the airbags 120, 122. Airbag 120, shown in an inflated state, is positioned to protect the head of the occupant and airbag 122, also shown in an inflated state, is positioned to protect the thorax. In FIG. 3, the lap and shoulder belts are shown in the uninflated condition as may be the case for a side impact.

Figure 4:
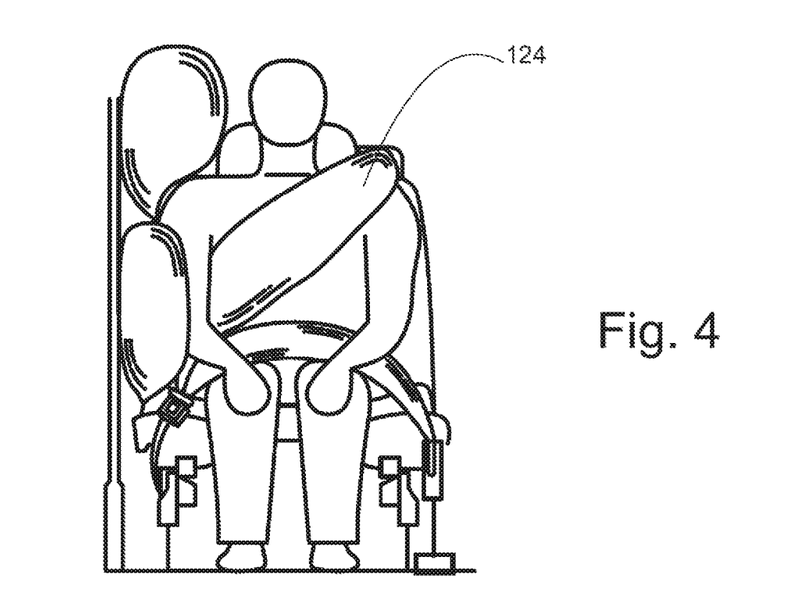
FIG. 4 illustrates the case of FIG. 3 with the lap and shoulder belts in the inflated condition.

In FIG. 4, the lap and shoulder belts are shown in the inflated condition. The shoulder belt 124 is a more conventional design which does not include the head protection section 28 of FIG. 1B. Naturally, this head protection section can be included along with seat deployed airbags.

In FIGS. 3 and 4, the shoulder belt has been positioned with the upper mounting on the inside of the vehicle in contrast to the typical case as shown in FIGS. 1A and 1B. Typically, as shown in FIGS. 1A and 1B, the uppermost part of the shoulder belt portion 14 is positioned on the outboard side of the seat.

Figures 5A, 5B, 5C:
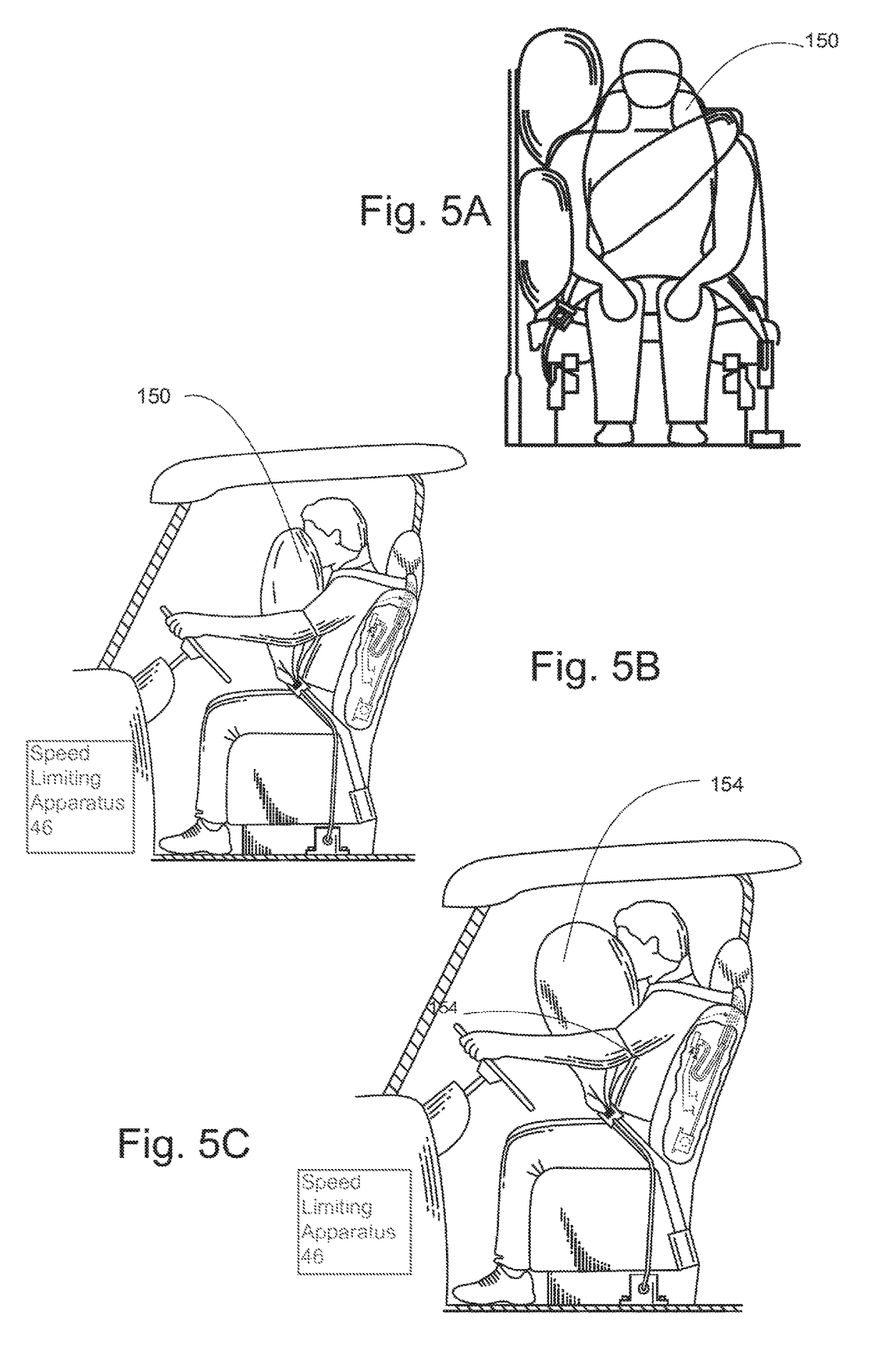
FIG. 5A illustrates the case of FIG. 4 with the addition of a frontal head and thorax protection airbag shown in fathom.
FIG. 5B illustrates the case of FIG. 5A with the shoulder belts not present or not inflated.
FIG. 5C illustrates the case of FIG. 5B with a larger lap belt mounted airbag.

FIGS. 5A, 5B and 5C illustrate the use of a face protecting airbag deployed from the lap belt portion 16 (in FIGS. 1A and 1B). FIG. 5A shows a frontal view of airbag 150 after deployment, along with deployment of the seat-mounted airbags as shown in FIGS. 3 and 4. FIG. 5B shows a side view illustrating deployed airbag 150. A somewhat larger airbag 154 is shown in FIG. 5C.

Figure 6:
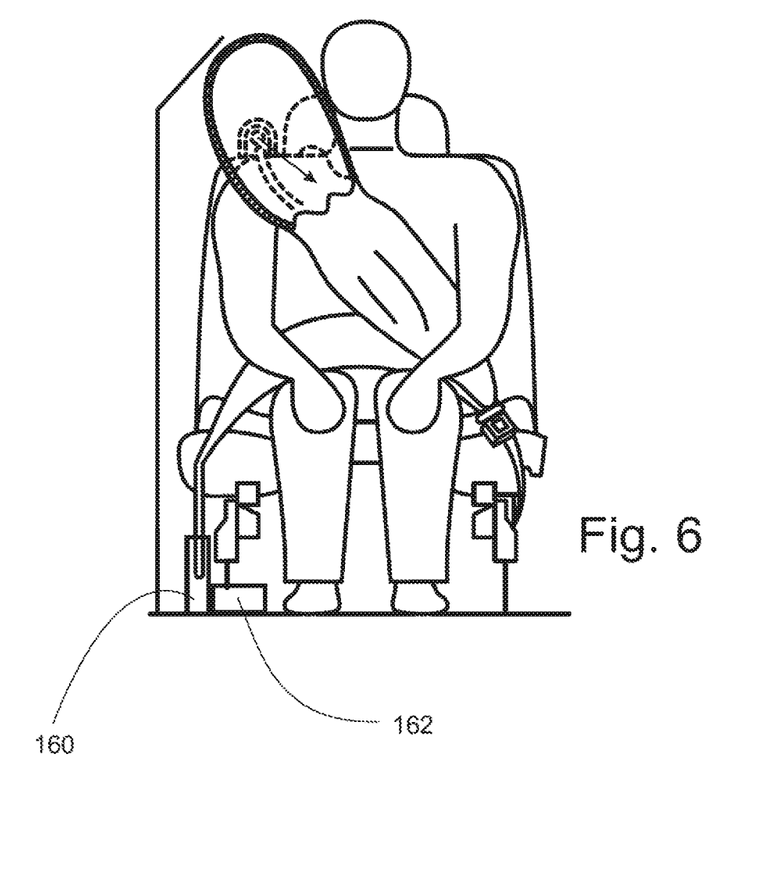
FIG. 6 is a view similar to that shown in FIG. 1A with the inflator mounted on the floor.

FIG. 6 illustrates the case where an inflator 160 is mounted to the floor of the vehicle adjacent to an ECU 162. Conduits are provided between the inflator 160 and the airbags in the shoulder and lap seatbelt portions, and through which the inflating medium flows from the inflator 160 to the airbags. instead of an inflator 160, an inflating medium providing system or means may be used, which provide, for example, compressed gas from a stored source thereof. Other types of inflator means known those skilled in the art are possible for use in the invention.

Figure 7:
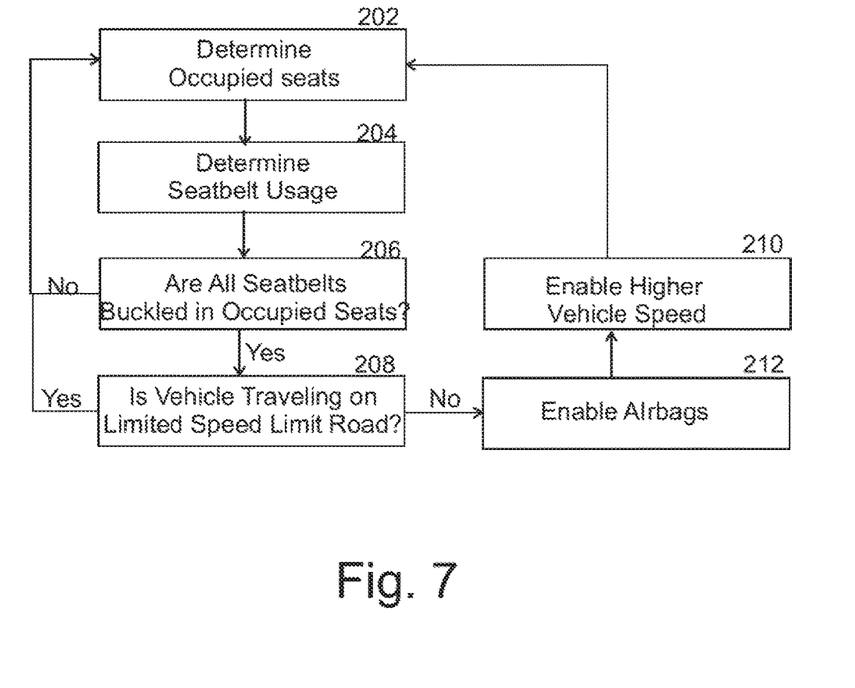
FIG. 7 is a flowchart illustrating the operation of the seatbelts interlock system for controlling the maximum speed of the vehicle.

FIG. 7 is a flow chart of the process of enabling higher speed travel of a golf cart or ATV. The controller (an ECU as described above) interrogates the seat switches and/or sensors to determine which seats are occupied at 202, a preliminary but optional step. This interrogation may be designed such that each switch or sensor (or alternatively another component capable of performing this seat occupancy status determination function) provides a signal indicative of occupancy of the seat or non-occupancy of the seat. The same controller, or a different controller, then interrogates the seatbelt buckle switches and, if present the spool-out switches, to determine those seats for which the seatbelts are buckled or more generally being used, and presumably properly buckled and worn, at step 204. This interrogation may be designed such that each switch (or alternatively a sensor or other component capable of performing this seat belt buckle status function) provides a signal indicative of the seat belt being buckled and/or the seat belt not being buckled.

If one or more of the seatbelts is/are not properly buckled and thus not considered to be in use, then control is passed from step 206 back to step 202. A warning may be provided using an audio and/or visual system to inform the occupant that they must buckle their seatbelts in order to continue travel on the road they are currently travelling on or continue to approach the road they want to travel on. This will allow them an opportunity to buckle the seatbelt to enable their desired travel path.

If all occupied seats have buckled seatbelts (presuming proper use of the seatbelt) as determined in step 206, then control is passed to step 208 where a determination is made by an existing same controller or a new, different controller, using the GPS and map database whether the vehicle. is traveling on a road which permits higher speed operation of golf carts and ATVs. This determination may be made by other techniques, which may but are not required to, compare the current position of the vehicle (obtained, e.g., using GPS) to information about the road at that location, i.e., the road on which the vehicle is travelling (obtained, e.g., using a map database).

By using data from a seatbelt spool-out sensor in combination with a buckle sensor in the controller, it is possible to determine not only that the seatbelt is buckled (which presumes but does not require proper seatbelt usage), but also that the seatbelt is properly being used in front of the occupant. That is, using only a buckle switch provides an indication that the seatbelt is connected to the buckle, but it might be intentionally situated behind the occupant. As such, with the combination of data from a spool-out sensor and a seatbelt buckle switch, it is possible to assure that the seatbelt is not only buckled but also situated in front of the occupant (in view of a range of spool out corresponding to expected occupancy) and thus highly likely to be in proper use.

A determination may also be made whether the vehicle is about to travel on a road which permits higher speed operation of golf carts and ATVs, i.e., headed toward such a route based on current position and velocity. Velocity may be determined by successive position determinations.

Step 208 may not be present in some implementations of the invention in which case, control is passed to step 210. In step 210, the seatbelt-mounted and seat-mounted airbags, and any others that might be present, are enabled. This enabling step may be performed in any manner known to those skilled in the art. Enabling of the airbags means that the airbags are permitted to deploy if deployment conditions are determined to be present. Not all of the airbags must deploy simultaneously and deployment would depend if the deployment conditions are determined to be present. The deployment conditions would be determined to be present by a processor that receives input about, for example, a crash and vehicle occupancy, and analyzes this input to output a deployment decision. This analysis may be performed by any known technique, including the use of pattern recognition.

In step 212, the vehicle speed limiting apparatus is disabled and the vehicle is permitted to operate at higher speeds (this speed limiting apparatus being shown schematically as 46 in FIGS. 5B and 5C). This disabling of the vehicle. speed limiting apparatus 46 means that a restriction on the speed of the vehicle is removed. Any controllable system that selectively or conditionally restricts or limits vehicle speed may be used in the invention, and are known to those skilled in the art. The speed limiting apparatus 46 may he coupled to the engine, accelerator pedal, or other vehicular component to prevent vehicle speed above the set threshold when actuated, for example. Thus, in addition to viewing the invention as a higher speed permitting technique (by disabling, the speed limiting apparatus 46), it may also be viewed as a speed limiting technique wherein a speed of the golf cart or all-terrain vehicle is limited on the road on which the golf cart or all-terrain vehicle is travelling on or about to travel on when at least one seatbelt for an occupant determined to be present is determined not to be buckled.

This restriction may be reconsidered as the vehicle moves, to account for the possibility that the characteristics of the road on which the vehicle is travelling change as well as changes in the occupancy of the vehicle, e.g., one of the occupants has removed his or her seatbelt. Reconsideration would entail continually or periodically obtaining current data from the seatbelt sensors and switches, and then revisiting the control scheme depicted in FIG. 7. In this manner, if one of the occupants removes their seatbelt, the higher vehicle speed will not be enabled and the vehicle will be caused to slow down.

After step 212, control is passed back to step 202 and the process repeated.

An important aspect of the manner in which a golf cart or all-terrain vehicle is controlled in the manner depicted in FIG. 7 is that in order for the golf cart or all-terrain vehicle to be driven above a certain speed on a road permitting this higher speed, the airbag-containing seatbelts must be buckled. As mentioned above, these airbag-containing seatbelts preferably have an airbag housed within the web portion, as opposed to an attachment to the web portion. Airbags attached to and thus not contained, packaged or housed within seatbelt portions are described in Adomeit (U.S. Pat No. 6,460,881) and Schneider et al, (U.S. Pat. No, 8,840, 137).

The control system that implements the flowchart shown in FIG. 7 may be any processor coupled to the identified sensors and/or switches whose input is necessary to enable the processor to execute the flowchart. For example, the control system may include a processor that is in communication with the seatbelt buckle switches to determine seat occupant (step 202) and the seatbelt spoolout switches to determine seatbelt usage (step 204). One skilled in the art would readily understand how to design the control system to provide the functionality described in connection with the flowchart in FIG. 7.

For any of the airbags described herein, various airbag constructions may be used. For example, the airbags may be woven film airbags.

Many changes, modifications, variations and other uses and applications of the subject invention will become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the following claims.

For example, although the invention disclosed above is described with particular emphasis for its application and use in golf carts and all-terrain vehicles, other vehicles are encompassed within the invention so that the same embodiments of the invention may also be used in automobiles and cars that have similar features to golf carts and all-terrain vehicles, notably, their inability to be used with conventional safety systems for automobiles in view of lack of the same structure as such automobiles and cars. Some reasons these types of vehicles cannot be used with conventional automobile safety systems includes the absence of an instrument. panel capable of supporting one or more airbags and/or a steering wheel that is incapable of supporting a driver airbag. More generally, the invention is therefore applicable to vehicles that lack a front end that is capable of supporting traditional airbags that deploy from a position in front of an occupant rearward against the occupant, such as steering wheel-mounted and instrument panel-mounted airbags.

The invention claimed is:

1. A method for regulating travel of a golf cart or all-terrain vehicle on both roads which permit only low speed operation up to a limit and roads which permit higher speed operation above the limit, comprising:
   determining, using an electronic controller on the golf cart or all-terrain vehicle, seatbelt usage for each occupant of the golf cart or all-terrain vehicle;
   determining, using a location determining system at least partly on the golf cart or all-terrain vehicle and coupled to the electronic controller, a current location of the golf cart or all-terrain vehicle;
   determining, using the electronic controller coupled to the location determining system and that receives from the location determining system the current location of the vehicle, whether the golf cart or all-terrain vehicle is travelling on or about to travel on one of the roads which permits higher speed operation of golf carts and all-terrain vehicles based on the current location of the vehicle;
   when it is determined that the golf cart or all-terrain vehicle is travelling on one of the roads which permits higher speed operation of golf carts and all-terrain vehicles, enabling travel of the golf cart or all-terrain vehicle on the road which permits higher speed operation only when all seatbelts are determined to be in use; and
   when it is not determined that the golf cart or all-terrain vehicle is traveling on one of the roads which permits higher speed operation of golf carts and all-terrain vehicles and thus is traveling on one of the roads which permit only low speed operation, enabling travel of the golf cart or all-terrain vehicle on the road which permits only low speed operation even when any of the occupants is determined not to be using a seatbelt.

2. The method of claim 1, further comprising enabling airbag deployment when it is determined that the golf cart or all-terrain vehicle is travelling on or about to travel on one of the roads which permits higher speed operation of golf carts and all-terrain vehicles.

3. The method of claim 1, further comprising determining, using the electronic controller, occupancy of all seats in the golf cart or all-terrain vehicle by interrogating switches or sensors associated with the seats whereby each switch or sensor provides a signal indicative of occupancy of one of the seats.

4. The method of claim 1, wherein the step of determining seatbelt usage comprises interrogating switches associated with the seatbelts whereby each switch provides a signal indicative of buckling of an associated one of the seatbelts.

5. The method of claim 1, wherein
   the step of determining the current location of the golf cart or all-terrain vehicle comprises using GPS to obtain the current location of the golf cart or all-terrain vehicle; and
   the step of determining whether the golf cart or all-terrain vehicle is travelling on or about to travel on one of the roads which permits higher speed operation of golf carts and all-terrain vehicles based on the current location of the vehicle comprises
      accessing a map database containing location data on roads which permit higher speed operation of golf carts and all-terrain vehicles, and
      comparing the current location of the vehicle on one of the roads to location data about the one of the roads in the map database.

6. The method of claim 1, wherein the step of determining whether the golf cart or all-terrain vehicle is travelling on or about to travel on one of the roads which permits higher speed operation of golf carts and all-terrain vehicles comprises comparing the current location of the golf cart or all-terrain vehicle to information about the road at that location.

7. The method of claim 1, further comprising determining the velocity of the vehicle and wherein the step of determining whether the golf cart or all-terrain vehicle is travelling on or about to travel on one of the roads which permits higher speed operation of golf carts and all-terrain vehicles comprises comparing the current location and velocity of the golf cart or all-terrain vehicle to information about the road ahead of the current location to which the golf cart or all-terrain vehicle is directed based on the current location and velocity.

8. The method of claim 1, further comprising, while the golf cart or all-terrain vehicle is travelling on one of the roads which permits higher speed operation of golf carts and all-terrain vehicles:
   repeating the step of determining whether the golf cart or all-terrain vehicle is travelling on one of the roads which permits higher speed operation of golf carts and all-terrain vehicles; and
   when it is determined that the golf cart or all-terrain vehicle is travelling on one of the roads which does not permit higher speed operation of golf carts and all-terrain vehicles, causing the golf cart or all-terrain vehicle to reduce its speed.

9. The method of claim 1, further comprising, while the golf cart or all-terrain vehicle is travelling on one of the roads which permits higher speed operation of golf carts and all-terrain vehicles:
   repeating the seatbelt usage determining step; and
   when it is determined that a seatbelt for an occupant is no longer buckled, causing the golf cart or all-terrain vehicle to reduce its speed.

10. The method of claim 1, further comprising enabling deployment of a face protection airbag contained within a lap belt that is adapted to extend across a lap of the occupant when present in one of the seats, the face protection airbag being deployable outward from the lap belt and upward to attain a position alongside the head of the occupant when present in the seat and thereby provide a cushion for the head of the occupant when present in the seat.

11. The method of claim 1. further comprising enabling deployment of a face protection airbag contained within a shoulder belt that is adapted to extend diagonally across a torso of the occupant when present in one of the seats. the face protection airbag being deployable outward from the shoulder belt and upward to attain a position alongside the head of the occupant when present in the seat and thereby provide a cushion for the head of the occupant when present in the seat.

12. The method of claim 1, wherein the step of determining seatbelt usage comprises considering data from a respective spool-out sensor coupled to each seatbelt and that provides an indication of spool out of the seatbelt to thereby enable an indication to be provided of seatbelt usage.

13. The method of claim 1, further comprising determining, using the electronic controller, occupancy of all seats in the golf cart or all-terrain vehicle by considering data from a respective weight sensing switch arranged in each seat and that providing an indication of weight applied to the seat.

14. A method for regulating travel of a golf cart or all-terrain vehicle on both roads which permit only low speed operation up to a limit and roads which permit higher speed operation above the limit, comprising:
   determining, using an electronic controller on the golf cart or all-terrain vehicle, usage of seatbelts for each occupant of the golf cart or all-terrain vehicle;
   determining, using a location determining system at least partly on the golf cart or all-terrain vehicle and coupled to the electronic controller, a current location of the golf cart or all-terrain vehicle;
   determining, using the electronic controller coupled to the location determining system and that receives from the location determining system the current location of the vehicle, whether the golf cart or all-terrain vehicle is travelling on or about to travel on one of the roads which permits higher speed operation of golf carts and all-terrain vehicles based on the current location of the vehicle; and
   when it is determined that the golf cart or all-terrain vehicle is traveling on one of the roads which permits higher speed operation of golf carts and all-terrain vehicles, limiting a speed of the golf cart or all-terrain vehicle, using a speed limiting apparatus, on the road on which the golf cart or all-terrain vehicle is travelling on or about to travel on which permits higher speed operation of golf carts and all-terrain vehicles only when at least one seatbelt associated with an occupant of the golf cart or all-terrain vehicle is determined not to be in use;
   whereby when it is not determined that the golf cart or all-terrain vehicle is traveling on one of the roads which permits higher speed operation of golf carts and all-terrain vehicles and thus is traveling on one of the roads which permit only low speed operation, the speed limiting apparatus does not limit the speed of the golf cart or all-terrain vehicle on the road which permits only low speed operation even when at least one seatbelt associated with an occupant of the golf cart or all-terrain vehicle is determined not to be in use.

15. The method of claim 14, wherein each of the seatbelts has at least one associated airbag, further comprising enabling airbag deployment when it is determined that the golf can or all-terrain vehicle is travelling on or about to travel on one of the roads which permits higher speed operation of golf carts and all-terrain vehicles.

16. The method of claim 14, wherein the step of determining seatbelt usage comprises interrogating switches associated with seatbelts whereby each switch provides a signal indicative of buckling of the associated seatbelt.

17. The method of claim 14, wherein the step of determining seatbelt usage comprises considering data from a respective spool-out sensor coupled to each seatbelt and that provides an indication of spool out of the seatbelt to thereby enable an indication to be provided of seatbelt usage.

18. The method of claim 14, wherein
   the step of determining the current location of the golf cart or all-terrain vehicle comprises using GPS to obtain the current location of the golf cart or all -terrain vehicle; and
   the step of determining whether the golf cart or all-terrain vehicle is travelling on or about to travel on one of the roads which permits higher speed operation of golf carts and all-terrain vehicles based on the current location of the vehicle comprises
      accessing a map database containing location data on roads which permit higher speed operation of golf carts and all-terrain vehicles, and
      comparing the current location of the vehicle on one of the roads to location data about the one of the roads in the map database.

19. The method of claim 14, wherein the step of determining whether the golf cart or all-terrain vehicle is travelling on or about to travel on one of the roads which permits higher speed operation of golf carts and all-terrain vehicles comprises comparing the current location of the golf cart or all-terrain vehicle to information about the road at that location.

20. The method of claim 14, further comprising determining the velocity of the vehicle and wherein the step of determining whether the golf cart or all-terrain vehicle is travelling on or about to travel on one of the roads which permits higher speed operation of golf carts and all-terrain vehicles comprises comparing the current location and velocity of the golf cart or all-terrain vehicle to information about the road ahead of the current location to which the golf cart or all-terrain vehicle is directed based on the current location and velocity.

* * * * *

UNITED STATES PATENT AND TRADEMARK OFFICE
CERTIFICATE OF CORRECTION

PATENT NO.      : 9,616,747 B1
APPLICATION NO. : 14/641613
DATED           : April 11, 2017
INVENTOR(S)     : David S. Breed Page 1 of 1

It is certified that error appears in the above-identified patent and that said Letters Patent is hereby corrected as shown below:

In the Claims
Claim 11, Column 13, Line 38, change "claim 1." to --claim 1,--;
Claim 11, Column 13, Line 41, change "seat." to --seat,--.
Claim 15, Column 14, Line 33, change "can" to --cart--.

Signed and Sealed this
Sixth Day of June, 2017

Michelle K. Lee
*Director of the United States Patent and Trademark Office*